US006670934B1

United States Patent
Muoio et al.

(10) Patent No.: US 6,670,934 B1
(45) Date of Patent: Dec. 30, 2003

(54) METHOD AND SYSTEM FOR DISTRIBUTING ART

(75) Inventors: David Muoio, Issaquah, WA (US); James Cook, Bellevue, WA (US); Richard Hasha, Seattle, WA (US)

(73) Assignee: William H. Gates, III, Medina, WA (US)

( * ) Notice: Subject to any disclaimer, the term of this patent is extended or adjusted under 35 U.S.C. 154(b) by 0 days.

(21) Appl. No.: 09/322,207

(22) Filed: May 28, 1999

Related U.S. Application Data

(60) Provisional application No. 60/118,668, filed on Feb. 3, 1999.

(51) Int. Cl.[7] .................................................. G09G 5/00
(52) U.S. Cl. ...................................... 345/1.1; 345/730
(58) Field of Search ....................... 345/1–2, 326–329, 345/333, 356, 357, 1.1, 2.1, 2.2, 730, 748, 759; 725/78, 83; 434/307 R

(56) References Cited

U.S. PATENT DOCUMENTS

| 5,524,272 | A | * | 6/1996 | Podowski et al. | .......... 455/13.1 |
| 5,601,436 | A | * | 2/1997 | Sudman et al. | ......... 340/825.22 |
| 5,796,945 | A | * | 8/1998 | Tarabella | .................... 709/219 |
| 5,805,118 | A | * | 9/1998 | Mishra et al. | .................. 345/1 |
| 5,990,886 | A | * | 11/1999 | Serdy et al. | ................. 345/748 |
| 6,105,055 | A | * | 8/2000 | Pizano et al. | ............... 709/204 |
| 6,118,450 | A | * | 9/2000 | Proehl et al. | ............... 345/349 |
| 6,331,865 | B1 | * | 12/2001 | Sachs et al. | ................. 345/741 |

FOREIGN PATENT DOCUMENTS

| EP | 0889636 A2 | 1/1999 |
| EP | 0889636 A3 | 10/1999 |
| WO | WO96/00946 | 1/1996 |
| WO | WO98/50838 | 11/1998 |

OTHER PUBLICATIONS

"The virtual museum: an integrated text and image database"—Santini et al., Multimedia Signal Processing, 1998 IEEE Second Workshop, pp. 253–258, Dec. 7–9, 1998.*
An et al., "A Multimedia Distance Learning Trail Using ISDN BRI," *AT&T Technical Journal* 72(1): Jan./Feb. 15–21, 1993.
Maly et al., "A New Paradigm for Distance Learning: Interactive Remote Instruction," Old Dominion University, Aug. 28, 1994, pp. 682–689.
Davoli et al., "A Testbed for the Evaluation of an Interactive Multimedia Distance Learning Service," *IEEE*, pp. 1488–1493, Jun. 18, 1995.
Schmidt et al., "Configuring Function–based Communication Protocols for Multimedia Applications," University of California, Irvine, Jun. 1996, pp. 1–14.
Bisdikian et al., "MultiMedia Digital Conferencing: A Web–Enabled Multimedia Teleconferencing System," *IBM* 421(2): 281–298, Mar. 1998.

* cited by examiner

Primary Examiner—Richard Hjerpe
Assistant Examiner—Alexander Eisen
(74) Attorney, Agent, or Firm—Woodcock Washburn LLP

(57) ABSTRACT

An art distribution system for distributing art to multiple display devices within an environment. The art distribution system provides a technique for specifying images to be displayed in an environment. The art distribution system provides a hierarchical representation of spaces within the environment. Each space may be further subdivided into subspaces. The art distribution system allows a user to select a space within the hierarchy and then to select an image that is to be displayed at the display devices within the selected space. The art distribution system then displays the selected image within the space including within all subspaces of the selected space. The art distribution system may allow a subsequent assignment of the image to a subspace to override within that subspace the previous selection of an image for the space.

49 Claims, 18 Drawing Sheets

Figur 13

METHOD AND SYSTEM FOR DISTRIBUTING ART

CROSS-REFERENCE TO RELATED APPLICATIONS

This application claims benefit of U.S. Patent Application No. 60/118,668, entitled "COMMON DISTRIBUTED OBJECT PLATFORM," filed on Feb. 3, 1999; and is related to U.S. patent application Ser. No. 09/322,455, entitled "METHOD AND SYSTEM FOR TRACKING SOFTWARE COMPONENTS," filed on May 28, 1999; U.S. patent application Ser. No. 09/322,962, entitled "METHOD AND SYSTEM FOR TRACKING CLIENTS," filed on May 28, 1999; U.S. patent application Ser. No. 09/322,643, entitled "AUDIO VISUAL ARCHITECTURE," filed on May 28, 1999; U.S. patent application Ser. No. 09/322,459, entitled "METHOD AND SYSTEM FOR CONTROLLING ENVIRONMENTAL CONDITIONS," filed on May 28, 1999; U.S. patent application Ser. No. 09/322,965, entitled "METHOD AND SYSTEM FOR IMPLEMENTING VIRTUAL FUNCTIONS OF AN INTERFACE," filed on May 28, 1999; U.S. patent application Ser. No. 09/322,964, entitled "METHOD AND SYSTEM FOR GENERATING A USER INTERFACE FOR DISTRIBUTED DEVICES," filed May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999, the disclosures of which are incorporated herein by reference.

TECHNICAL FIELD

The described technology relates generally to a computer system for displaying art and, more particularly, to a system that displays electronic images in a distributed environment.

BACKGROUND

Prior to the electronic imaging of art, each artwork could only be displayed at one location. If a copy of the artwork was made, then those copies could be displayed at additional locations. With the advent of electronic imaging of art, electronic images could be displayed at multiple locations using multiple computer displays. In addition, the artwork that is displayed at a computer display can be changed automatically at periodic intervals for one artwork to the next. A play list of images can be defined. The computer system that processes the play list displays each image in sequence at periodic intervals. In environments such as museums, a central computer system may control the displaying of a play list at various display devices throughout the museum. The central computer system may maintain a database of the images, and the museum administrator can define play lists and can specify on which display devices are the images of the play lists to be displayed. Such techniques for displaying art may be acceptable for museums, but may be unacceptable in other environments. The techniques may be acceptable in a museum because only the administrator from a central location defines the play lists and specifies the display devices at which the play lists are to be displayed and because each image that can possibly be displayed needs to be stored at the central computer system before it is assigned to a play list.

In other environments, such as a large house or an office building, it may be desirable to allow users to control the display of images from input devices throughout the environment. In addition, it would be desirable if the images that can be assigned to a play list were not limited to those currently stored at the computer system. Finally, it would be desirable if an image is automatically made available for inclusion in play lists when the computer system detects that the image satisfies user-specified criteria and that the bitmap for the image is now accessible and can be downloaded to the computer system.

SUMMARY

An art distribution system for distributing art to multiple display devices within an environment is provided. The art distribution system provides a technique for specifying images to be displayed in an environment. The art distribution system provides a hierarchical representation of spaces within the environment. Each space may be further subdivided into subspaces. The art distribution system allows a user to select a space within the hierarchy and then to select an image that is to be displayed at the display devices within the selected space. The art distribution system then displays the selected image within the space including within all subspaces of the selected space. The art distribution system may allow a subsequent assignment of the image to a subspace to override within that subspace the previous selection of an image for the space. The image to be displayed may be part of a play list of images.

The art distribution system also provides for the downloading of images in a background mode from a remote image storage device. The art distribution system provides an image administration module that allows a user to identify images that are to be included in a play list. The image administration module then sends the identity of those images to an art server. Upon receiving the identity of those images, the art server determines whether the bitmaps for those images have already been stored at the art server. If a bitmap for an image has not already been stored, then the art distribution system requests that the image be downloaded from an image storage device to the art server.

The art distribution system also allows a user to specify that image information for accessible images that match specified criteria should be downloaded when those images become accessible. The art distribution system periodically transmits the criteria to image storage devices. The image storage devices identify those images that satisfy the criteria and then provides those identifications to the art distribution system. The art distribution system stores information describing those images so that a user can subsequently select those images to be included in a play list. The bitmap for an image can then be retrieved after the image is assigned to a play list.

The art distribution system also allows for a user to specify the play list that is to be displayed on a display device from a user control point device that may be located in the same room as the display device. The art distribution system provides a user interface at a user control point device to which a user can specify the play list for a certain space. In this way, the users can control the play list assignments from distributed locations.

DETAILED DESCRIPTION

Figure 1:
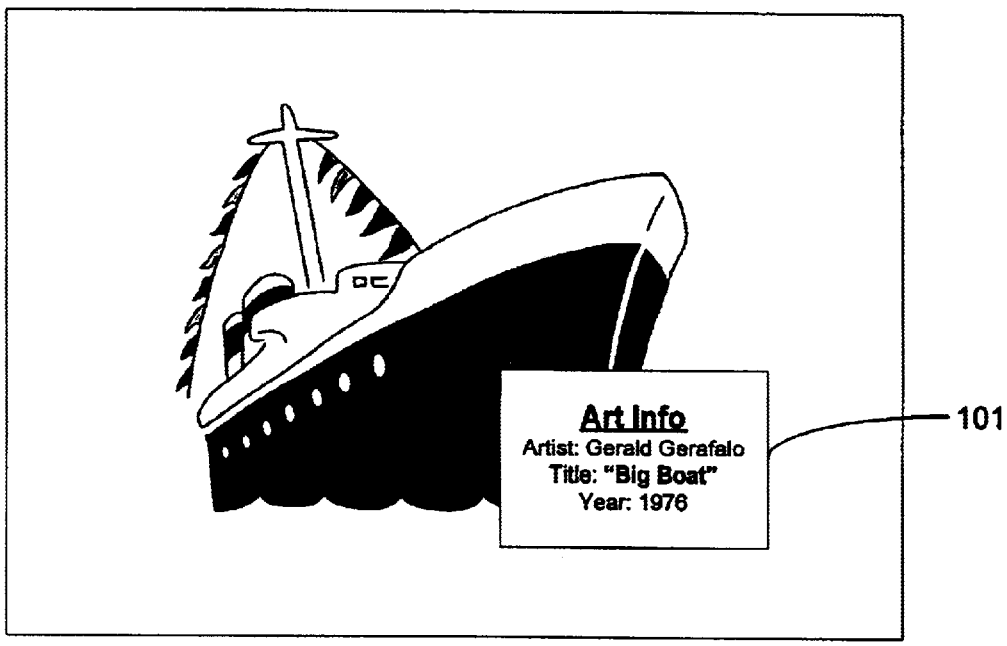
FIG. 1 illustrates a displaying of an image along with image information.

A method and system for distributing images throughout an environment is provided. The art distribution system allows a user to specify play lists of images and to specify display devices at which the images of the play lists are to be displayed. The art distribution system maintains a database of the images that are specified in the play lists. The environment in which the art distribution system displays images is hierarchically organized into spaces and subspaces. For example, if the environment is a large house, then the spaces may be the east wing and west wing of the house, the subspaces of the east wing may be the bedrooms and the kitchen, and the subspaces of the bedrooms may be the master bedroom, the guest bedroom, and so on. Each space within the hierarchy may have one or more display devices within it. For example, the master bedroom may have several display devices that are capable of displaying art images. The art distribution system allows a user to specify that a play list is to be displayed at any level in the hierarchy. For example, a user may specify that a certain play list is to be displayed throughout the east wing of the house, and the art distribution system will display that play list at every display device within the east wing. If a user then specifies that a subspace of the east wing, such as the master bedroom, is to display another play list, then the art distribution system will display that other play list at all display devices within the master bedroom. The art distribution system will, however, continue to display the original display list within the other spaces of the east wing. The art distribution system may also include a non-override mode in which the specifying of a play list for a space will not override a play list that has the specifically specified for a subspace. For example, if a new play list is specified for the east wing, that play list will be display throughout the east wing except within the master bedroom because the master bedroom was specifically assigned a master play list.

The art distribution system allows a user from within any space to control the play list that is currently being displayed within that space. Each space may have a user control point devices, such as a touch panel display, within it. A user can specify a play list to be displayed within the space using the user control point device. Thus, the art distribution system can be controlled from distributed locations rather than from only a central location. The display devices may also display image information in response to a user request. For example, if the display device is a touch panel display, then when a user touches the panel, the art distribution system displays information relating to the image currently being displayed. The information may include the name of the artist, the country of the artist, and the year in which the art was generated.

The art distribution system may also allow for images to be retrieved in a background mode and allow information on images to the retrieved as the images become accessible. The art distribution system provides a user interface through which a user can define, delete, and modify play lists. The art distribution system may display the names of the images, information relating to the image, and possibly even a thumbnail representation of the images to assist the user in defining a play list. If the art distribution system does not already have an electronic copy (e.g., a bitmap) of the full-sized image, then the art distribution system queues a request to download the image. A download module of the art distribution system is responsible for retrieving a copy of the image in a background mode and storing it in the image database of the art distribution system. In addition, a user can define criteria for images of interest. For example, the user may specify an interest in images of a certain artist. As new images of that artists become accessible, the art distribution system automatically retrieves information relating to those new images. In this way, a user can be made aware of certain classes of images as they become electronically accessible to the art distribution system. The art distribution system can retrieve information.

Figure 2:
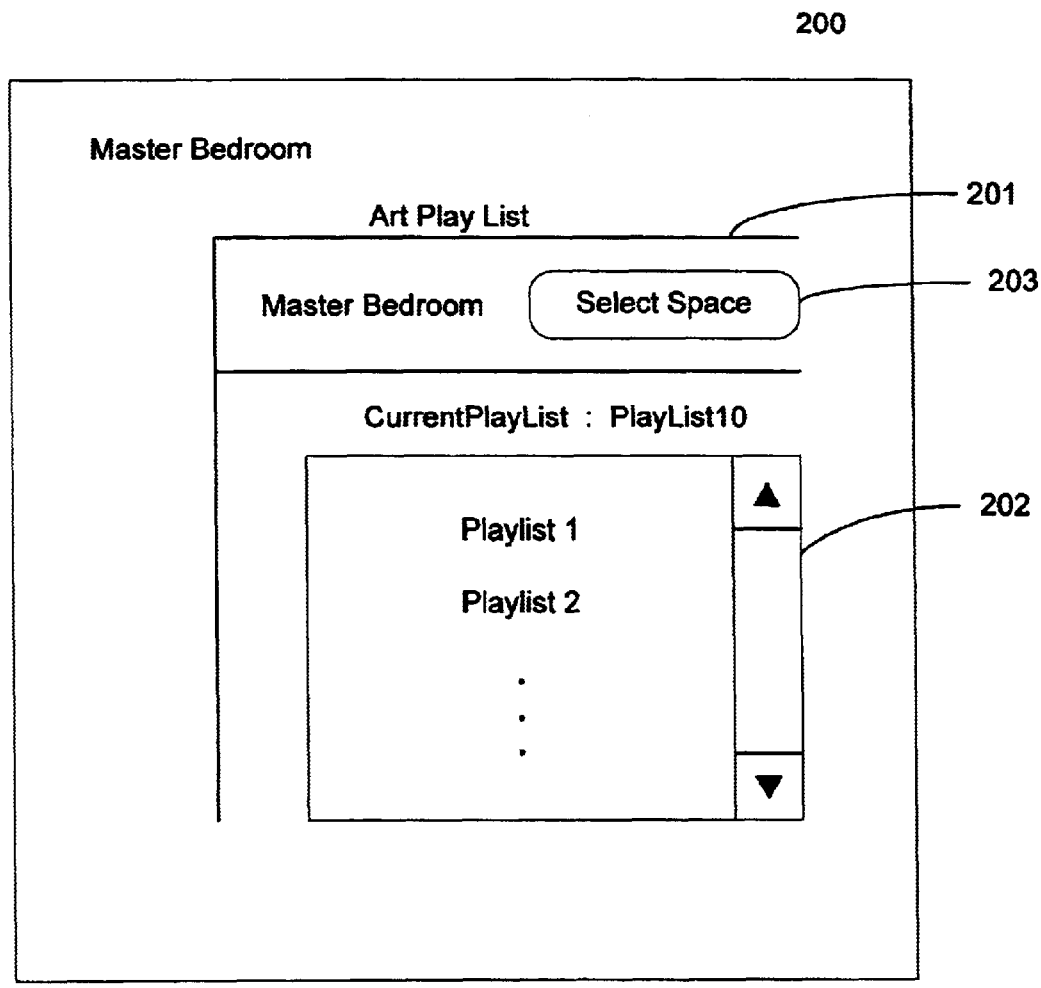
FIG. 2 illustrates the display of a user control point device for specifying a play list for a certain space.

FIGS. 1–5 illustrate portions of the user interface of the art distribution system in one embodiment. FIG. 1 illustrates a displaying of an image along with image information. The display device 100 displays the images of a play list under control of the art distribution system. The display device is currently displaying an image of a sail boat. When a user performs a specified action (e.g., touches a touch screen display or click a mouse button), the art distribution system displays a pop-up window 101 that contains information relating to the image currently being displayed. The information may include the name of the artist, the year in which the artist created the work, and so on. That pop-up window may be displayed for a predefined time interval or until user performs another action. FIG. 2 illustrates the display of a user control point device for specifying a play list for a certain space. The user control point device 200 is currently displaying an art play list panel 201. The art play list panel indicates that the current play list for the master bedroom is play list 10. The art play list panel also includes a scroll box 202 that contains a list of play lists that can be specified for the master bedroom. The user selects the desired play list from the scroll box. The art play list panel also contains a select space button 203. The art distribution system may allow the user to control the play list for other spaces from the current space (i.e., the master bedroom). When the user selects the select space button, the art distribution system displays a list of the spaces that can be controlled from the current space. When the user selects one of those spaces, then the art distribution system displays a panel similar to that shown in FIG. 2 for that other space.

Figure 3:
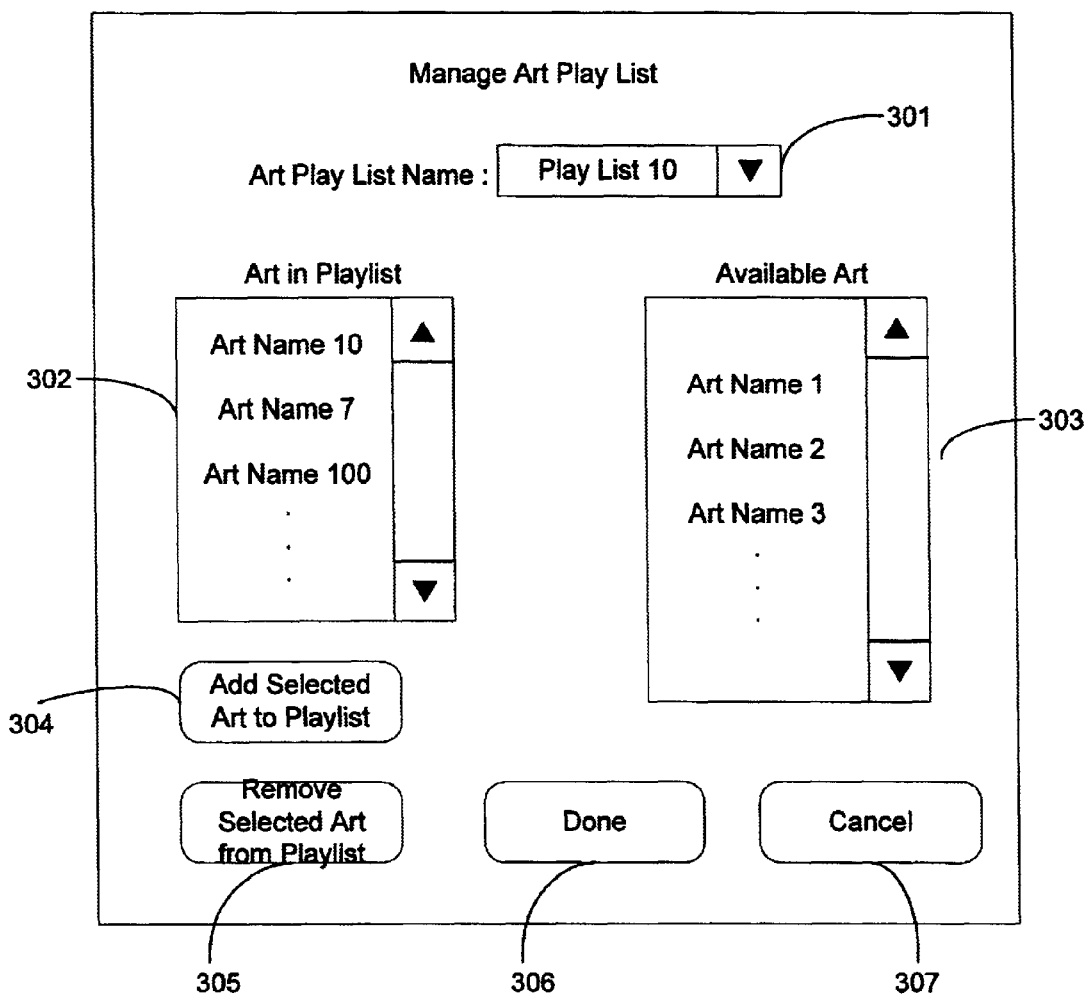
FIG. 3 illustrates a user interface for managing the play lists.

FIG. 3 illustrates a user interface for managing the play lists. The art distribution system allows a user to create and modify play lists. One skilled in the art will appreciate that many different user interfaces can be used for specifying play lists. The display 300 includes an art play list name drop-down list 301, an art play list scroll box 302, and an art available scroll box 303. The display also includes an add button 304, a remove button 305, a done button 306, and a cancel button 307. A user can either create a new play list or modify an existing play list using this user interface. To create a new play list, the user enters the name of the play list in the art play list name field portion of the drop-down list. The user then selects the art to be added to the play list from the art available scroll box. The user then selects the add button to add that art to the art play list. The art play list scroll box lists the images that are currently in the selected play list. To remove art from the art play list, the user selects the art from the art play list scroll box and then selects the remove button. To modify an existing play list, the user selects the play list using the art play list name list box to select the play list. In response, the art distribution system displays the images of the play list in the art play list scroll box. The user can then add, remove, and reorder the images of the play list and delete the play list itself.

Figure 4:
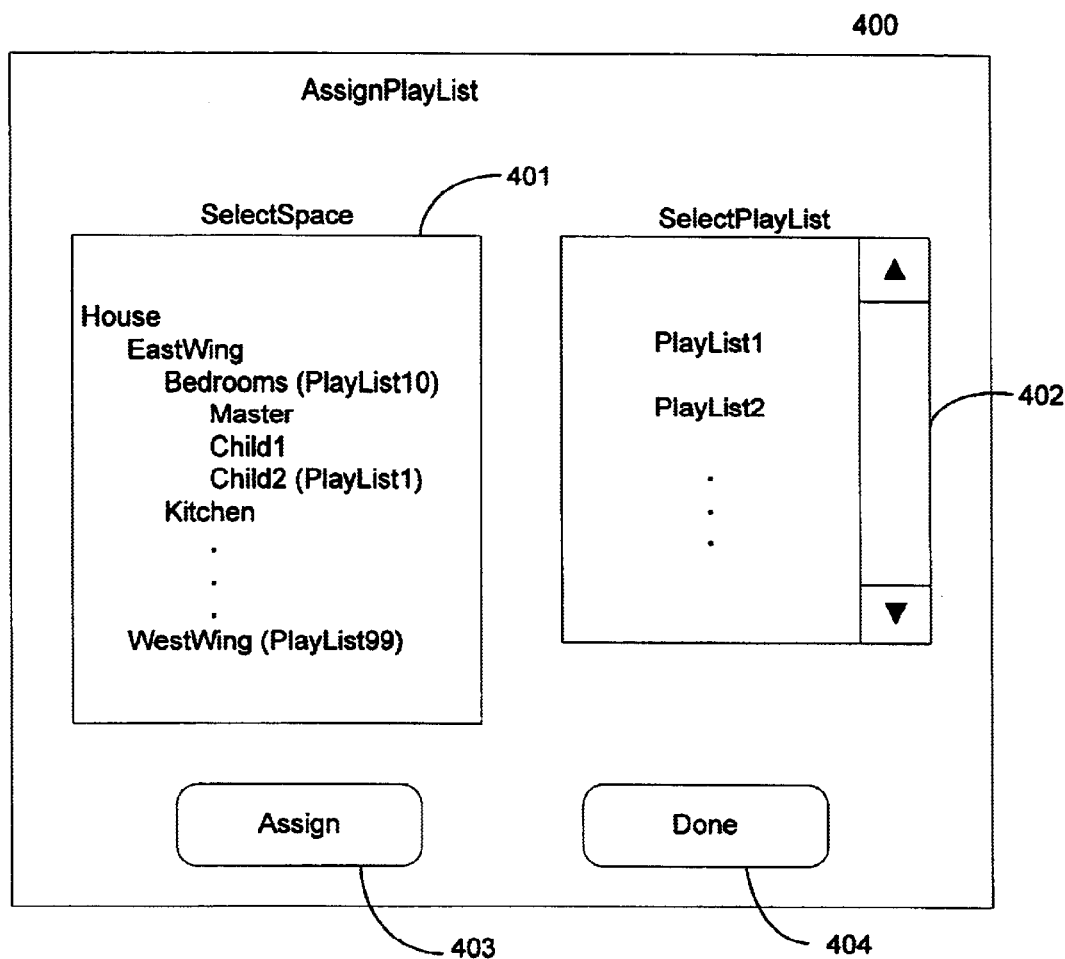
FIG. 4 illustrates a user interface for assigning a play list to a particular space.

FIG. 4 illustrates a user interface for assigning a play list to a particular space. The display 400 includes a space hierarchy window 401, a play list scroll box 402, an assignment button 403, and a done button 404. The space hierarchy window displays the space hierarchy for the environment in which the art distribution system is controlling. In this example, the environment is a house and the spaces include an east wing and west wing, the east wing includes a bedroom subspace, and so on. This hierarchy can be displayed in a manner similar to the well-known techniques for displaying a file system directory hierarchy. The art play list currently being displayed in each space is indicated in parentheses after the name in the space. For example, the bedrooms space is currently displaying art play list 10 and the subspaces master bedroom and child1 are also displaying art play list 10 because no play list was specifically specified for those spaces. The subspace child2 is displaying play list 1. A users assigns a play list to a space by selecting a play list from the play list scroll box, by selecting a space from the space hierarchy window, and by then selecting the assign button. The art distribution system then directs each device within that space to start displaying the play list.

Figure 5:
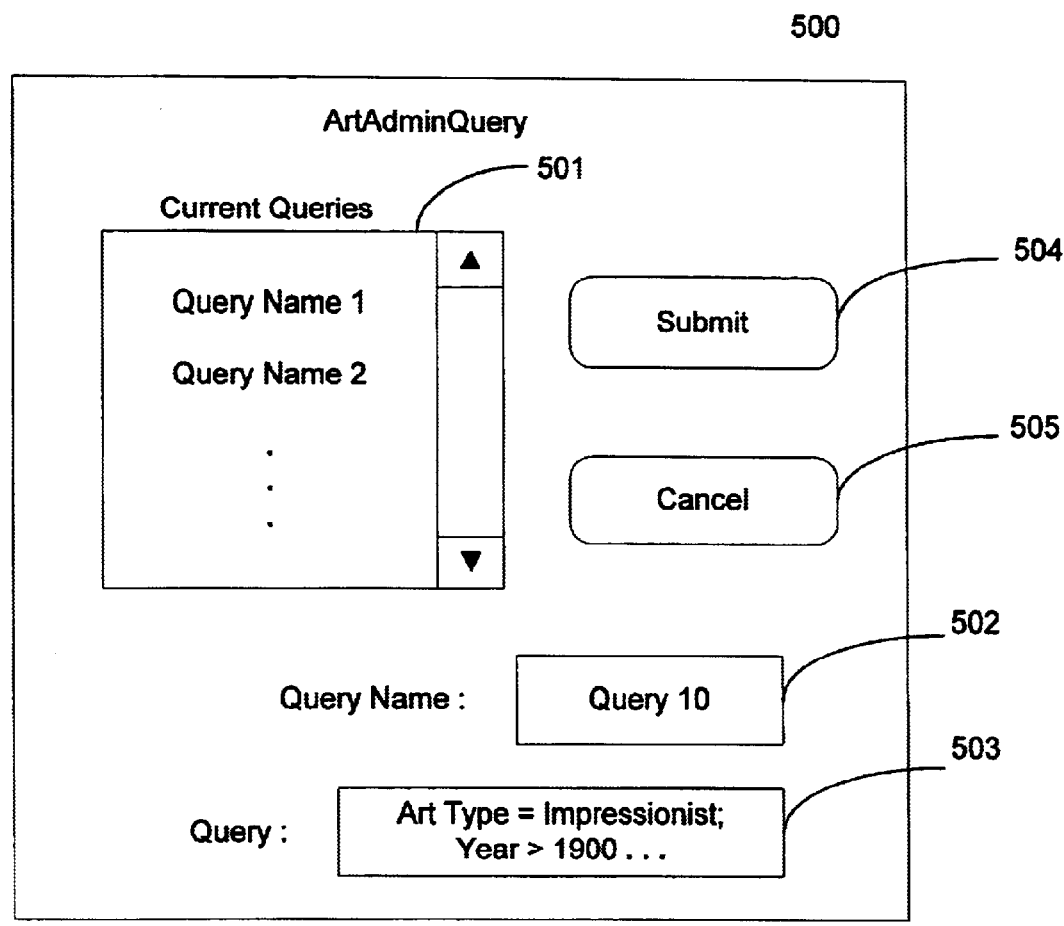
FIG. 5 illustrates a user interface for submitting a query for making images available to be put in a play list when images satisfying the query become available.

FIG. 5 illustrates a user interface for submitting a query for making images available to be put in a play list when images satisfying the query become available. In one embodiment, a query is associated with a play list, and when images that satisfy the query become accessible, they are automatically downloaded and added to the play list. The display 500 includes a current query scroll box 501, a query name field 502, and a query field 503. The display also includes a submit button 504 and a cancel button 505. To generate a new query, the user enters the name of the query in the query name field and then enters the query itself into the query field. One skilled in the art will appreciate that any well-known query specification technique can be used to define the query (e.g., SQL). To modify a query a user selects a current query from the current query scroll box. In response to the selection, the art distribution system displays the name and that query in the query name field and the query itself in the query field. When a user submits a new query or a modified query by pressing the submit button, the art distribution system starts a process of periodically checking to see if any new images are accessible to the art distribution system that satisfy that query.

Figure 6:
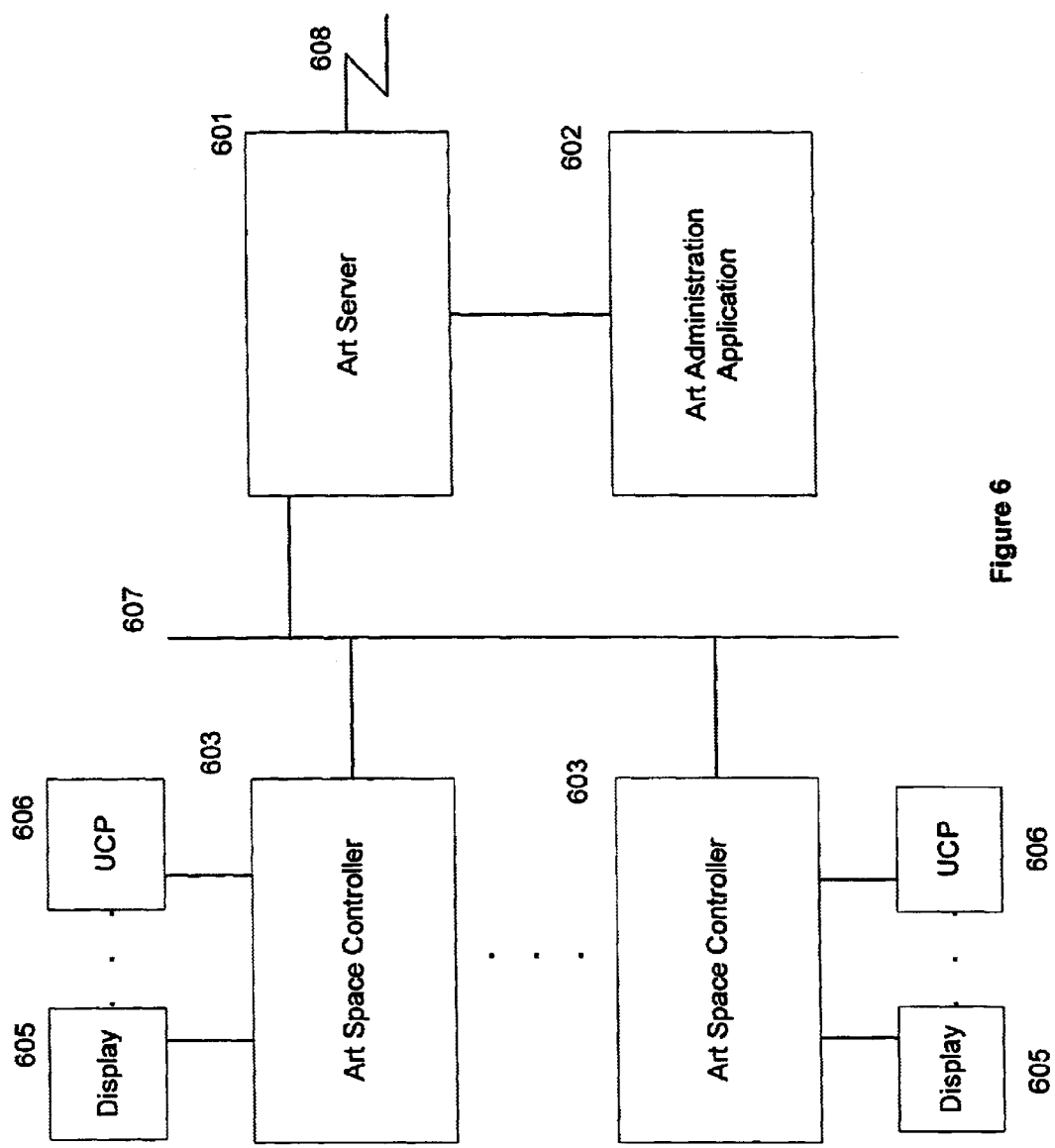
FIG. 6 is a block diagram of the components of the art distribution system in one embodiment.

FIG. 6 is a block diagram of the components of the art distribution system in one embodiment. The art distribution system may be implemented in software and may execute on a computer system with a control processing unit, memory, and input/output devices. The software and data structures may be stored in a computer-readable medium such as a memory, CD-ROM, or disk and may be transmitted over a computer-readable data transmission medium such as the Internet. The art distribution system includes an art server 601, an art administration application 602, art space controllers 603, display devices 605, and user control point devices 606. The art server is connected to the art space controllers via communications channel 607, which may be a logical channel when various components execute on the same computer system. The art server communicates via communications channel 608 (e.g., the Internet) to an art mass storage device. The art mass storage device includes images and image information for accessible images. The art server includes a database of the bitmaps for the images that are currently specified in a play list. The art administration application allows a user to define play lists and submit queries. The art space controllers are assigned play lists and control the display of the play list on the display devices and control the user interface of the user control point devices.

Figure 7:
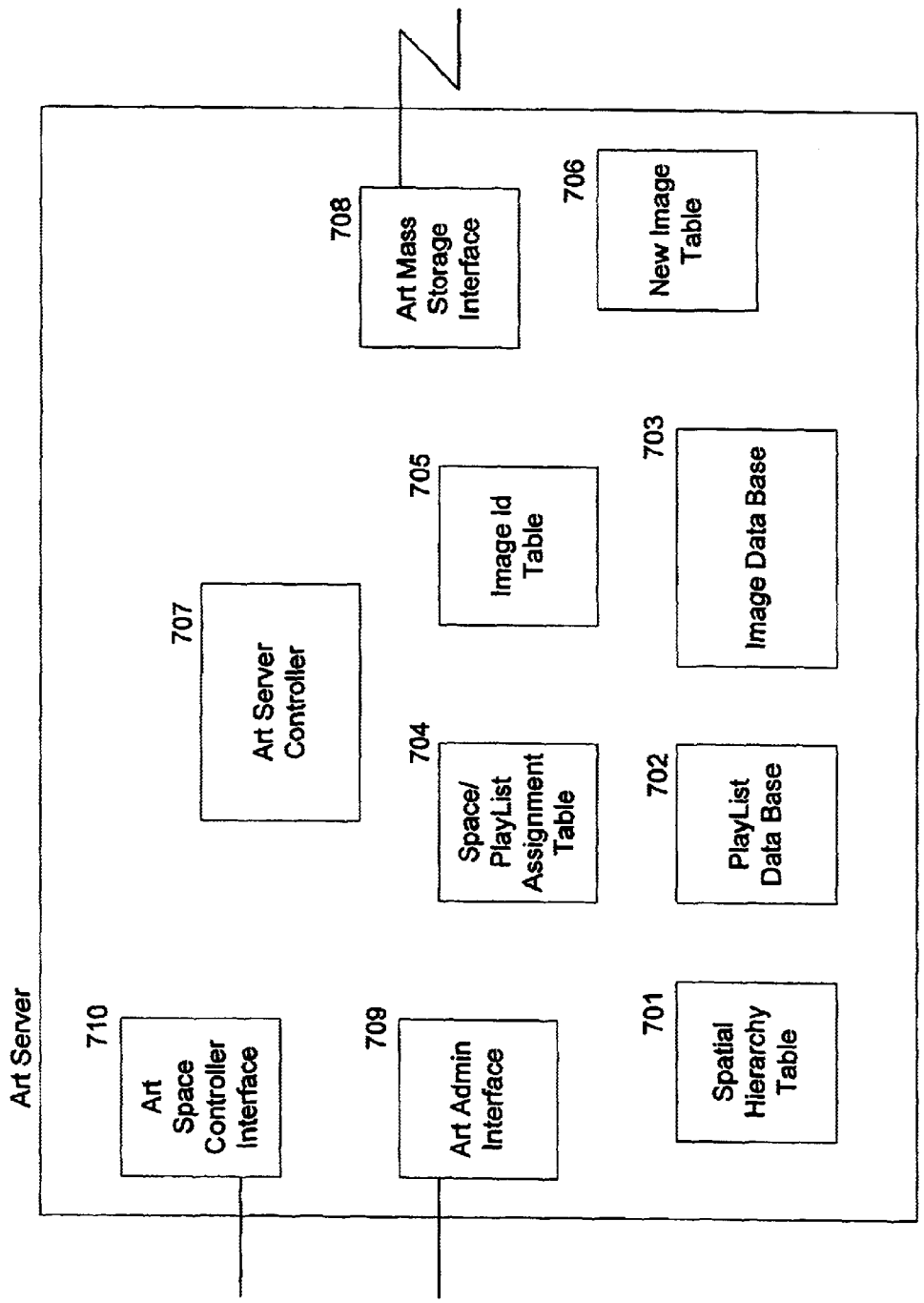
FIG. 7 is a block diagram illustrating the components of the art server in one embodiment.

FIG. 7 is a block diagram illustrating the components of the art server in one embodiment. The art server includes a spatial hierarchy table 701, a play list database 702, an image database 703, a space/play list assignment table 704, an image identifier table 705, and a new image table 706. The art server also includes an art server controller 707, an art mass storage interface 708, an art administration interface 709, and an art space controller interface 710. The spatial hierarchy table contains information describing the hierarchical organization of spaces within the environment controlled by the art server. The play list database contains the name of each play list that has been defined along with the identifiers of the images within the play list. Each play list may also have to a user-specified time associated with it that indicates the length of time each image in the play list is to be displayed. The image database contains the bitmap image of the images that have been defined in a play list. The space/play list assignment table contains the identification of each play list that is currently assigned to a space. For example, the master bedroom may be assigned play list 10. The image identifier table contains the identifier of images that are available to be included in a play list. The image identifier table may also include information describing the image including a thumbnail bitmap of the image to assist the user in determining whether that image should be included in a play list. The new image table contains a list of images that have been recently included in a play list and whose bitmaps need to be downloaded from the mass storage device. The art server controller controls the overall operation of the art server. This includes controlling the interface with the art administration application, responding to requests from the art space controllers, notifying the art space controllers of play list changes, and controlling the art mass storage interface. The art mass storage interface processes the new image table to retrieve the images that have been recently included in a play list. The art mass storage interface also periodically submits the queries to the art mass storage device to determine if any new images are accessible that satisfy the queries. The queries may be stored in a query table (not shown). The art administration interface serves as the interface between the art server and the art administration application. The art space controller interface serves as the interface between the art server and the art space controllers. When transmitting images to the art displays, the art server may spread the transmission over almost the entire time interval during which an image is displayed. For example, if an image is displayed for 60 seconds, then the art server may send $1/60^{th}$ of the next image every second. This allows the next image to be retrieved while the current image is displayed without overloading the communications channel with a burst of transmitted data.

Figure 8:
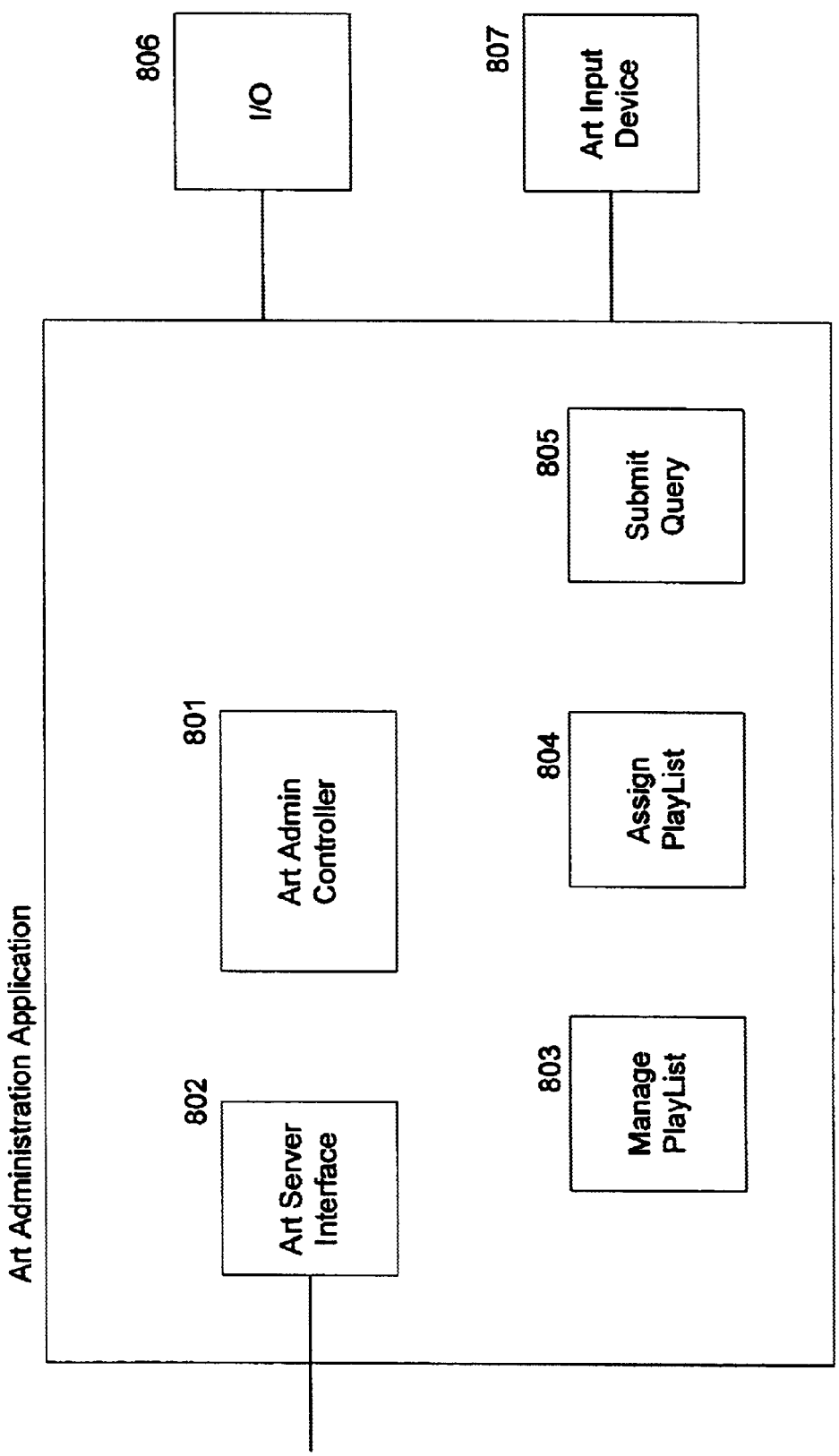
FIG. 8 is a block diagram illustrating components of an art administration application in one embodiment.

FIG. 8 is a block diagram illustrating components of the art administration application in one embodiment. The art administration application includes an art administration controller 801, an art server interface 802, a manage play list component 803, an assign play list component 804, and a submit query component 805. The art administration application interfaces with I/O devices 806, such as a keyboard and display, and interfaces with an art input device, such as an image scanner. The art administration controller controls the selection of whether the user wants to manage the play list, assign a play list to a space, or submit a query. The art server interface provides the interface from the art administration application to the art server.

Figure 9:
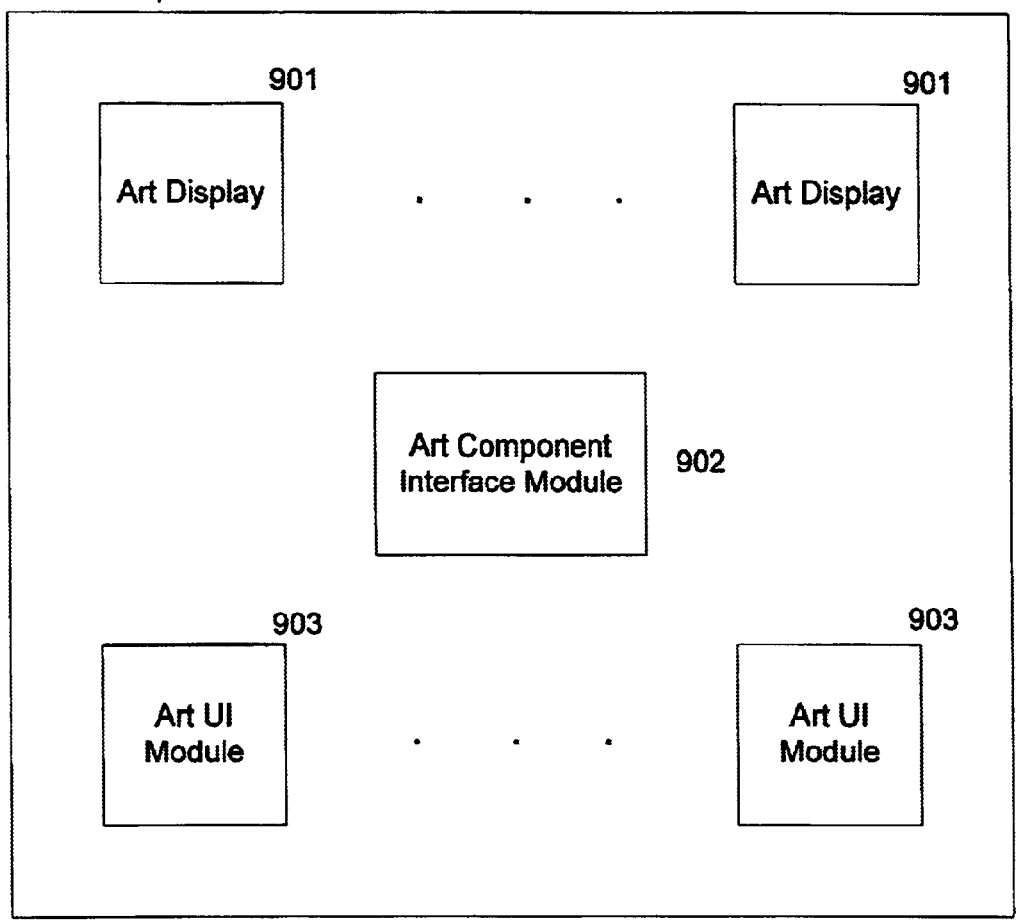
FIG. 9 is a block diagram illustrating components of an art space controller in one embodiment.

FIG. 9 is a block diagram illustrating components of an art space controller in one embodiment. The art space controller includes art display modules 901, an art component interface module 902, and art user interface modules 903. The art display modules are assigned a play list and loop through that play list retrieving the images from the art server and displaying the images on the associated display devices. The art component interface module provides the art display modules with the indication of the art display list that they are to display. The art user interface modules provide a user interface at a user control point device for selecting a play list that is to be displayed within the space.

In one embodiment, the art distribution system provides an accounting package that monitors the display of images and provides an accounting to the providers of the images. The accounting package may base the accounting for an image on how long the image has been stored at the art distribution system, the total time the image has been displayed, how many times the image has been displayed and so on. The accounting package keeps track of these statistics so that the providers can be paid accordingly. The accounting package may have a provider table that specifies how the accounting is to be performed for each provider and provides other provider-specific information, such as payment method, payment history, and so on. The image information associated with each image may include cost information and licensing restrictions related to that image. A user of the art distribution system may decide to include images in a play list based on the cost of the image. The query mechanism of the art distribution system may also take cost into consideration. For example, a query may have a maximum cost associated with it. Any image with a cost greater than that maximum cost would not satisfy the query. Alternatively, if an image would otherwise satisfy the query, the query mechanism may notify the user that an image that satisfies the query is accessible, but that its cost is more than the maximum cost. Upon receiving the notification, the user can then specify whether the image should be downloaded. To minimize the cost of images and reduce the storage space that is required, the art distribution system may automatically delete images when they are no longer included in a play list. Alternatively, the art distribution system may delay the automatic deletion for a certain period of time to allow the adding of the image to another play list without having to re-download the image.

Figure 10:
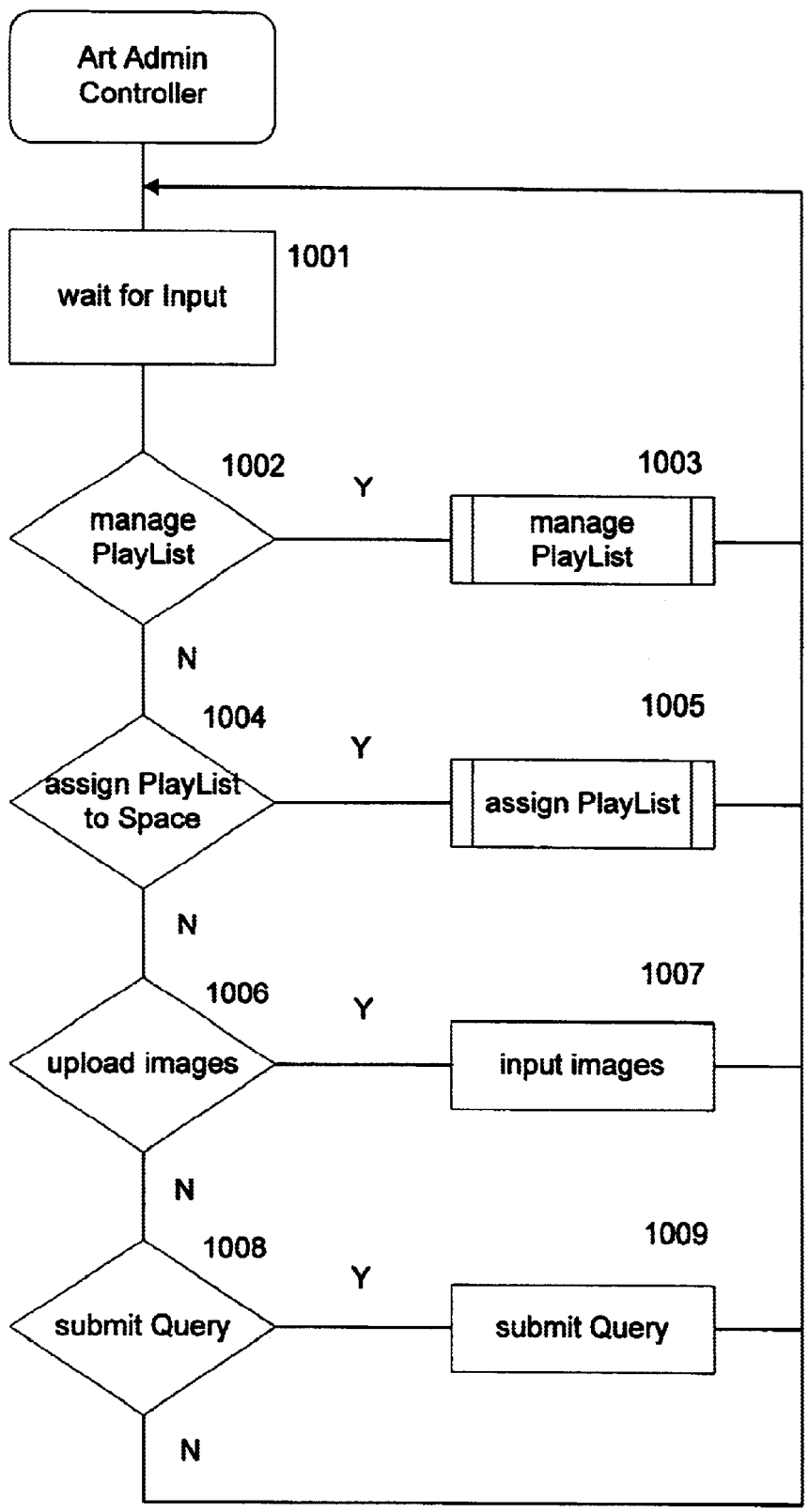
FIG. 10 is a flow diagram of the art administration controller.

FIGS. 10–18 are flow diagrams illustrating example processing of components of the art distribution system in one embodiment. FIG. 10 is a flow diagram of the art administration controller. The art administration controller allows the user to select which action to perform relating to the administration of the play lists. In step in 1001, the controller waits for input from the user. In step 1002, if the user selected to manage a play list, then the controller continues at step 1003, else the controller continues at step 1004. In step 1003, the controller invokes a function to control the managing of the play list. In step 1004, if the user selected to assign to play list to a space, then the controller continues at step 1005, else the controller continues at step 1006. In step 1005, the controller invokes the function to assign a play list to a space. In step 1006, if the user selected to a load images from an input device, such as a scanner, then the controller continues at step 1007, else the controller continues at step 1008. In step 1007, the controller inputs an image and provides it to the art server for storage in the image database. The user may also enter information describing the image. In step 1008, if the user selected to submit a query, then the controller continues at step 1009, else the controller loops to step 1001 to wait for user input. In step 1009, the controller invokes a function to submit a query.

Figure 11:
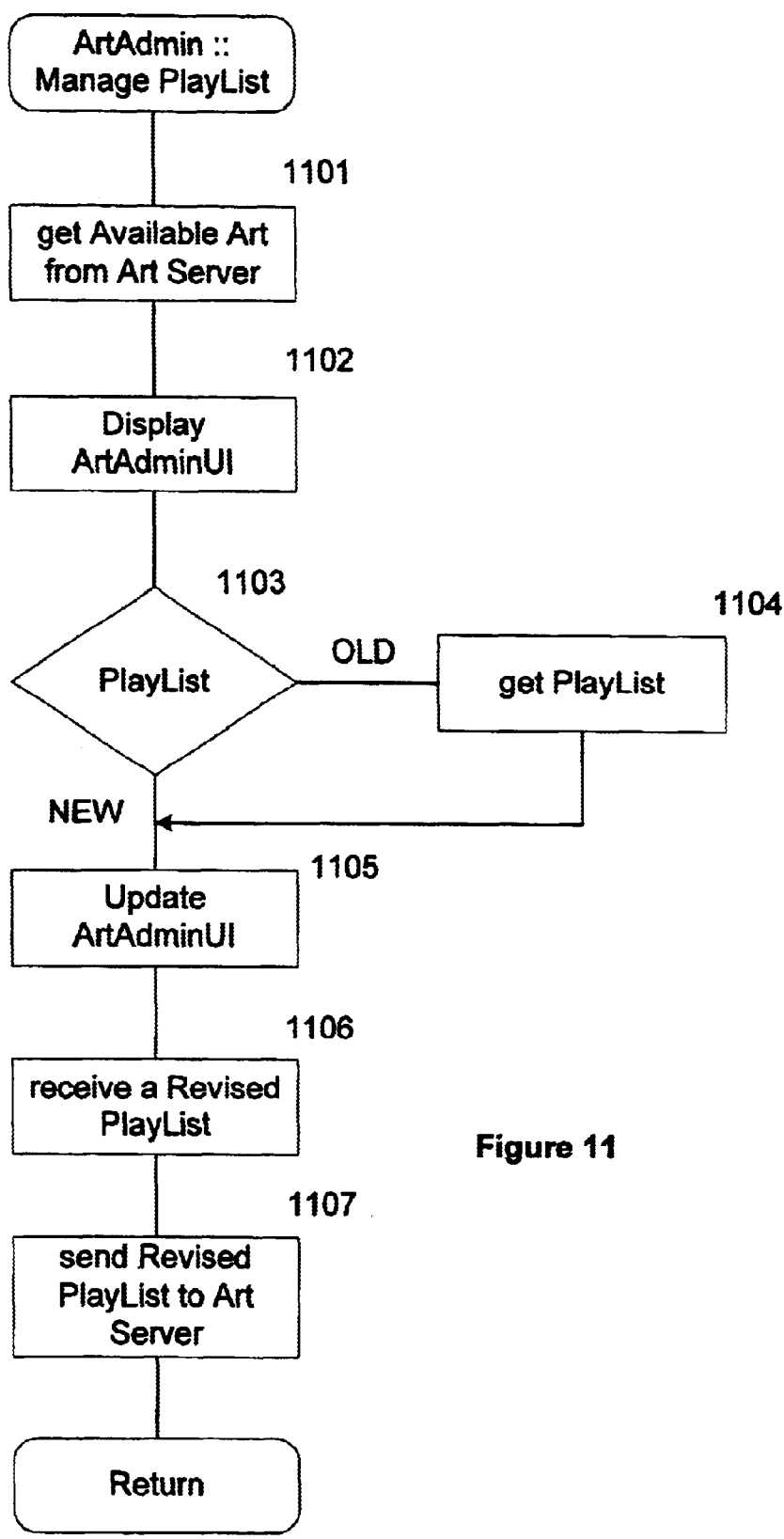
FIG. 11 is a flow diagram of the manage play list function of the art administration application.

FIG. 11 is a flow diagram of the manage play list function of the art administration application. This function displays the user interface corresponding to FIG. 3. In step 1101, the function retrieves information for the available art from the art server. In step 1102, the function displays the art management user interface. In step 1103, if the user selects to modify an existing play list, then the function continues at step 1104, else the function continues at step 1105. In step 1104, the function retrieves the old play list from the art server. In step 1105, the function updates the art management user interface to reflect the old play list. In step 1106, the function receives revisions to the play list from the user. In step 1107, the function sends the revised play list to the art server and returns.

Figure 12:
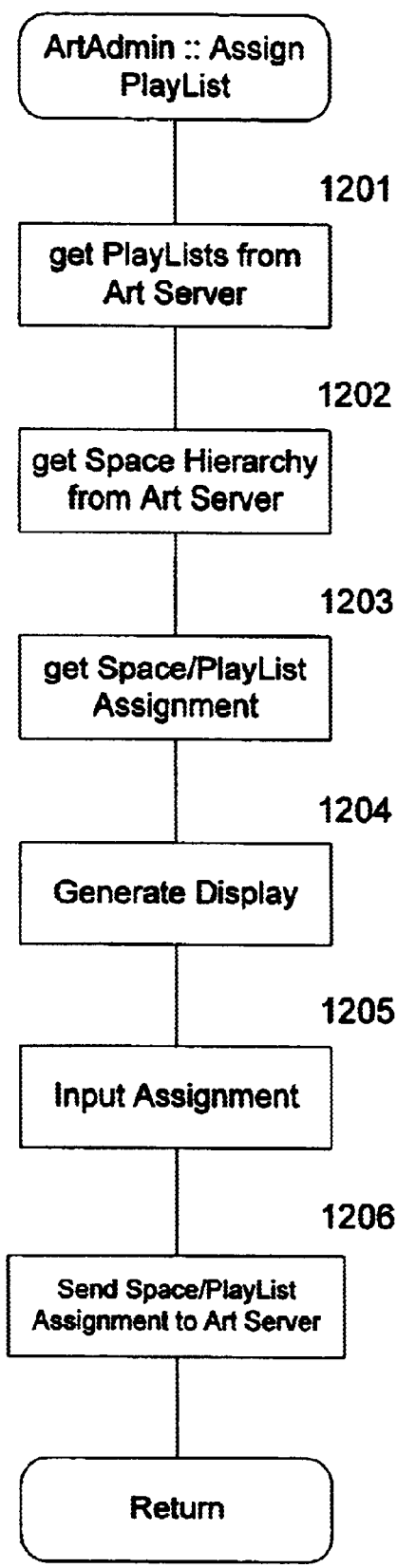
FIG. 12 is a flow diagram of the assign play list to space function.

FIG. 12 is a flow diagram of the assign play list to space function. The function displays the user interface corresponding to FIG. 4. In step 1201, the function retrieves the currently defined play lists from the art server. In step 1202, the function retrieves the space hierarchy from the art server. In step to 1203, the function retrieves the space/play list assignments from the art server. In step 1204, the function generates the display based on the retrieve data. In step 1205, the function receives user input of the assignment of a play list to a space. In step 1206, the function sends the space/play list assignment to the art server and then returns.

Figure 13:
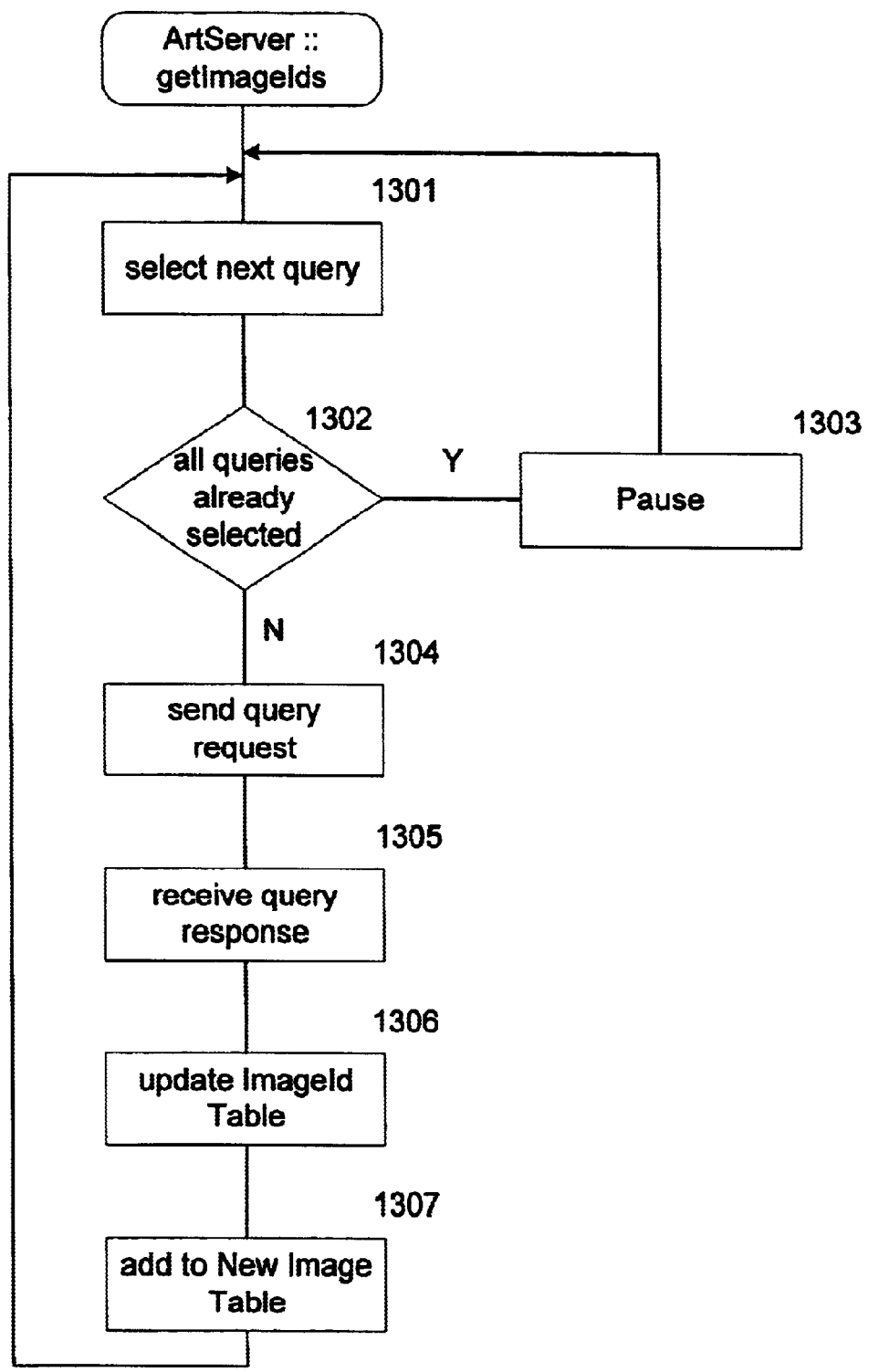
FIG. 13 is a flow diagram of the retrieve image identifier function of the art server.

FIG. 13 is a flow diagram of the retrieve image identifier function of the art server. This function is a part of the art mass storage interface. This function determines whether images that satisfy the queries are now accessible. In step 1301, the function selects the next query. In step 1302, if all the queries have already been selected, then the function continues at step 1303, else the function continues at step 1304. In step 1303, the function goes to sleep until the specified interval at which it is to next check for accessible images. The function then loops to step 1301 to process the queries. In step 1304, the function sends the query request to the mass storage device. In step 1305, the function receives the response to the query request. The sending and receiving of query requests and responses may be over the Internet and may use the hypertext transfer protocol ("HTTP"). In step 1306, the function updates the image identifier table with image information for images that are not already stored in the image identifier table. In step 1307, the function adds an entry to the new image table so that the image can be downloaded. The function then loops to step 1301 to select next query.

Figure 14:
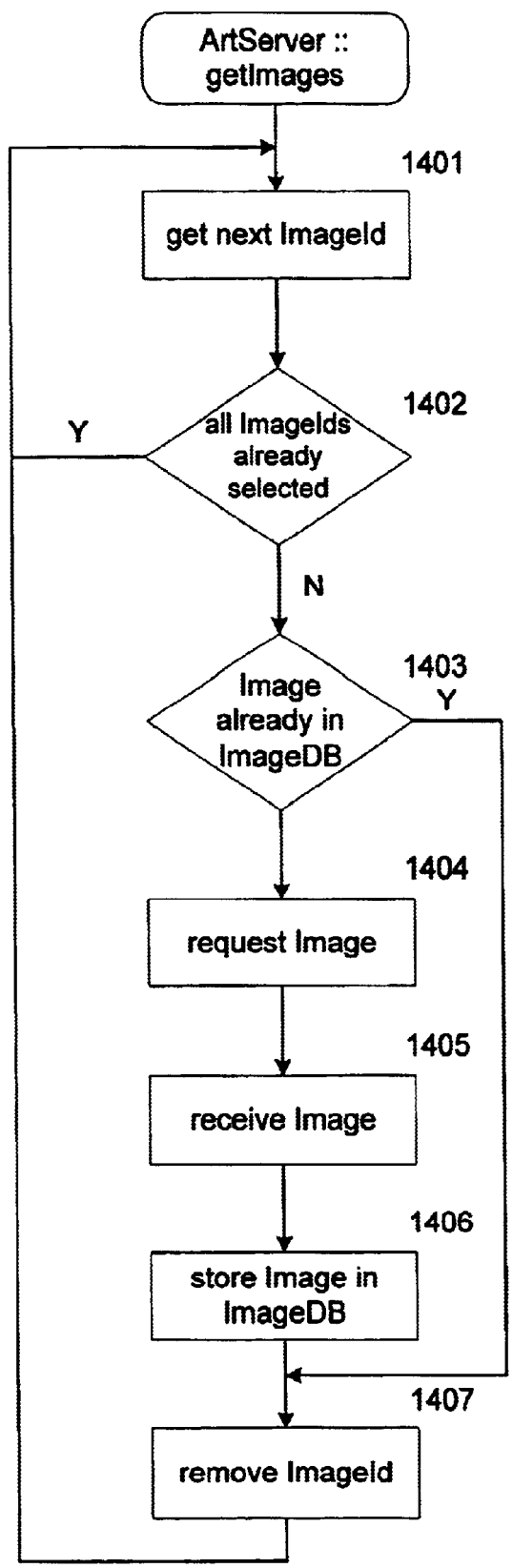
FIG. 14 is a flow diagram of the get images function of the art server.

FIG. 14 is a flow diagram of the get images function of the art server. The get images function is part of the art mass storage interface. This function processes the image identifiers that have been stored in the new image table and retrieves the corresponding image. In step 1401, the function retrieves the next image identifier, if any, from the new image table. In step 1402, if all the image identifiers have already been selected, then the function loops to step 1401, else the function continues at step 1403. In step 1403, if the image for the selected image indentifier is already in the image database, then the function continues at step 1407, else the function continues at step 1404. In step 1404, the function requests the image from the mass storage device. In step 1405, the function receives the image. In step 1406, the function stores the image in the image database. In step 1407, the function removes the selected image identifier from the new image table and loops to step 1401 to select the next image.

Figure 15:
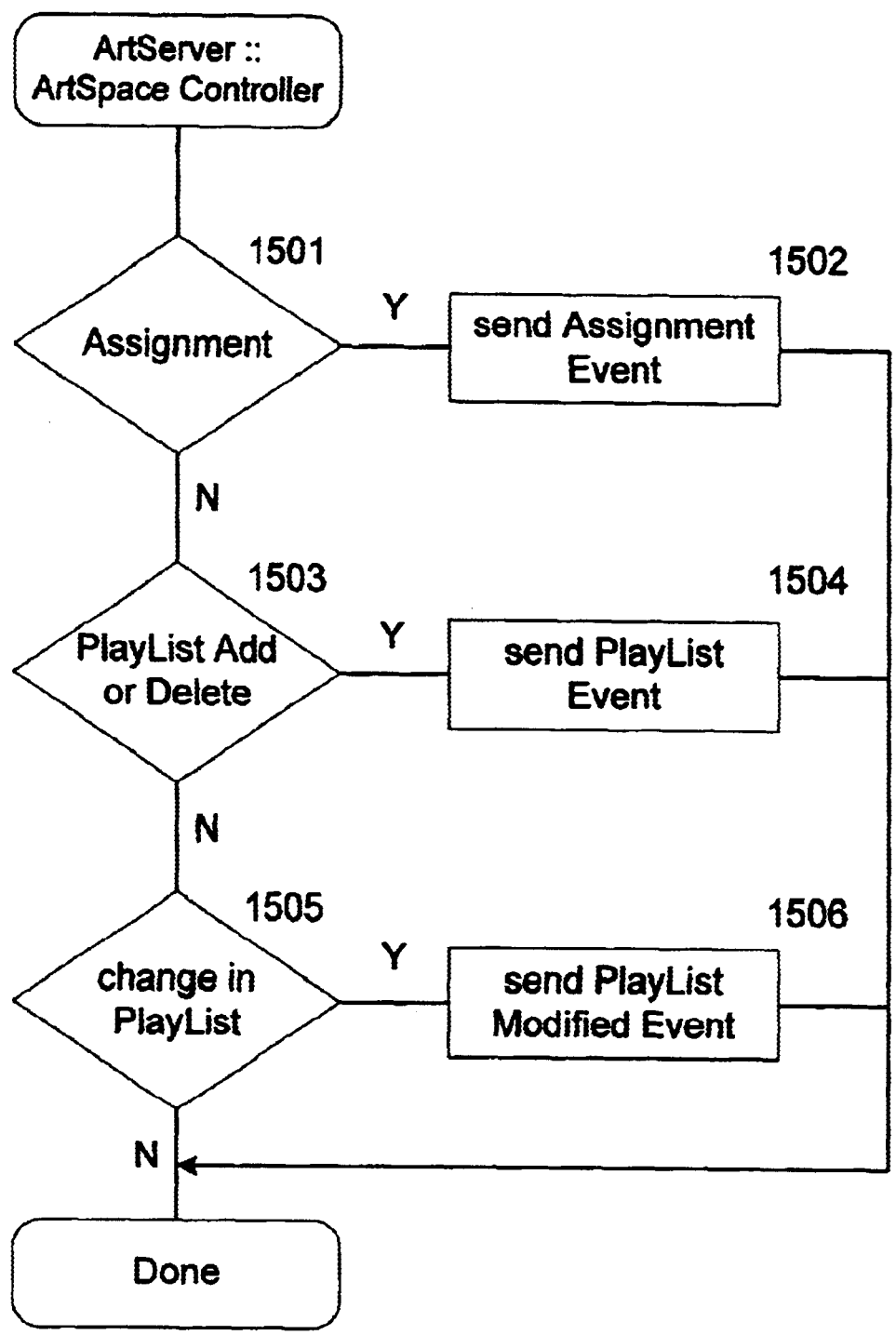
FIG. 15 is a flow diagram of the art space controller interface function.

FIG. 15 is a flow diagram of the art space controller interface function. This function identifies various conditions and sends event notifications to the art space controllers. In particular, the function identifies when a user has assigned a new play list to a space, identifies when a play list has been added or deleted, and identifies when a play list has been changed. In step 1501, if a new assignment has been made to a space, then the function sends an assignment event in step 1502, else the function continues at step 1503. In step 1503, if a play list has been added or deleted, then the function sends a play list modified event in step 1504, else the function continues at step 1505. In step 1505, if the play list has been changed, then the function sends a play list change event in step 1506, else the function completes.

Figure 16:
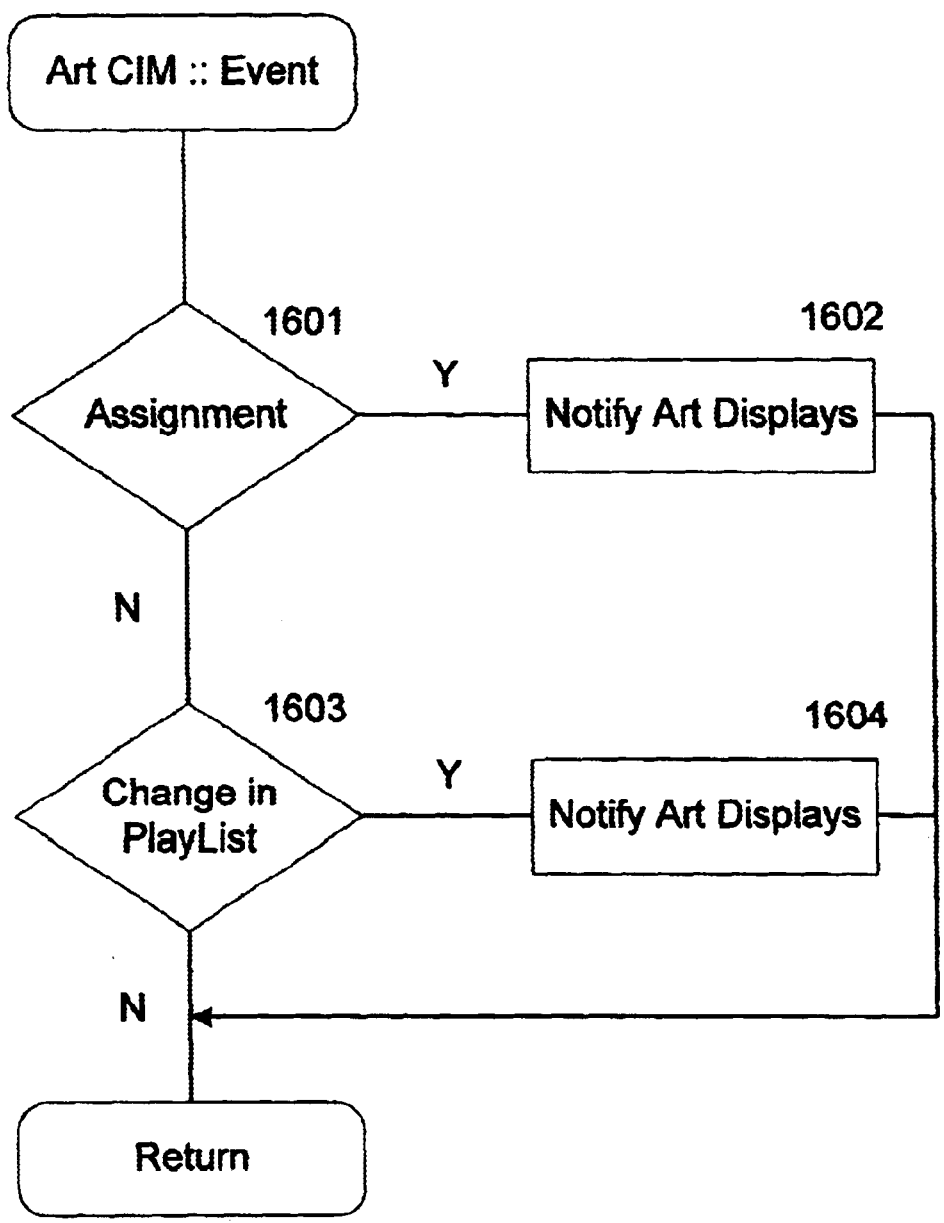
FIG. 16 is a flow diagram of the processing of receiving events at an art component interface module.

FIG. 16 is a flow diagram of the processing of receiving events at an art component interface module. In step 1601, if an assignment event is received, then the function notifies the art display modules in step 1602, else the function continues at step 1603. In step 1603, if a change play list event is received, then the function notifies the art display modules in step 1604, else the function returns.

Figure 17:
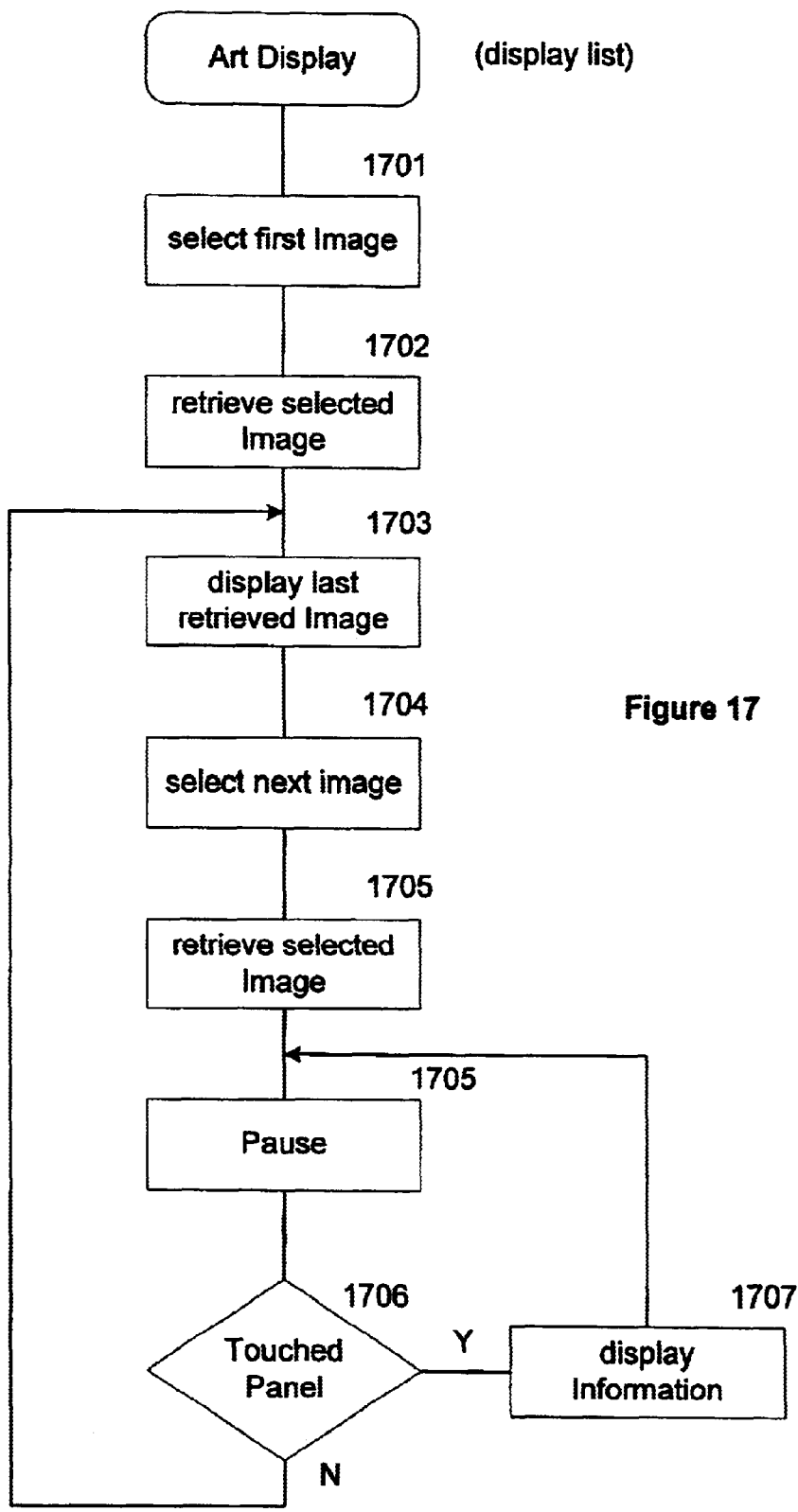
FIG. 17 is a flow diagram of the processing of an art display module.

FIG. 17 is a flow diagram of the processing of an art display module. The art display module overlaps the displaying of an image with retrieving from the art server of the next image to be displayed. The module continually displays the images in the play list by displaying the first image in the play list after the last image is displayed. The art display module is provided with a display list. In step 1701, the module selects the first image in the display list. In step 1702, the module retrieves the selected image from the art server. In steps 1703–1707, the module loops displaying the images in the play list at the specified intervals. In step 1703, the module displays the last retrieved image. In step 1704, the module selects the next image in the display list. In step 1705, the module retrieves the selected image from the art server. In step 1705, the modules pauses for the requisite interval or until a user touches the panel. In step 1706, if the user touches the panel, then the module continues at step 1707, else the module loops to step 1703 to select and display the last retrieve image. In step 1707, the function displays the information relating to the current image and then loops to step 1705 to pause. The display of the information corresponds to FIG. 1. In one embodiment, the module may cache the images so that each image of a play list only needs to be retrieved once.

Figure 18:
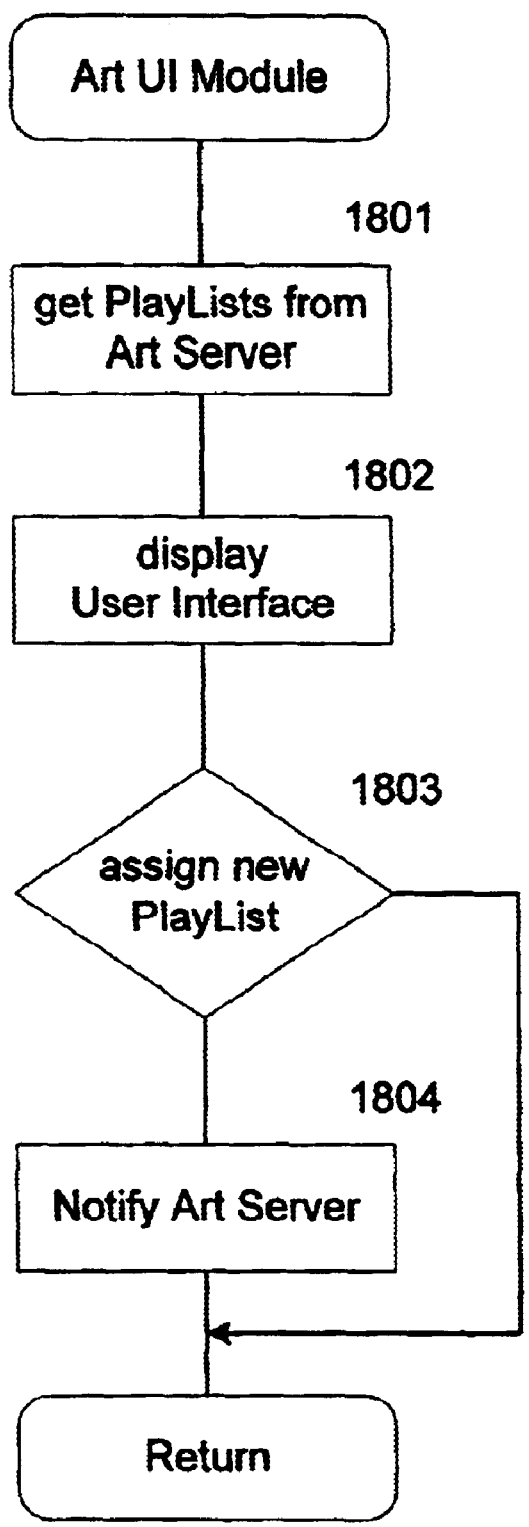
FIG. 18 is a flow diagram of the art user interface module.

FIG. 18 is a flow diagram of the art user interface module. This module controls the user interface of FIG. 2. In step 1801, the module retrieves the assigned play lists from the art server. In step 1802, the module displays the user interface for the user control point device. In step 1803, if the user indicated to assign a new play list the space, then the module continues at step 1804, else the module returns. In step 1804, the module notifies the art server to change the play list assignment for the space. The art server then sends out an event to notify the art space controllers that the play list has changed.

Although specific embodiments of, and examples for, the describe technology are presented for illustrative purposes, is not intended that the invention be limited to these embodiments. Equivalent methods, structures, processes, steps, and other modifications within the spirit of the invention are within the scope of the invention. For example, one skilled in the art will appreciate that the mass storage device may be a single storage device or multiple storage devices the may be provided by different vendors of images. Also, an image storage device may be provided with queries that then asynchronously notifies the art distribution system when images that satisfy the query become accessible. In this way, the art distribution system conceptually has "agents" working on its behalf. In one embodiment, the image storage device may be local to the art distribution system or some images may be stored in a local image storage device and others may be stored in a remote image storage device. The images may also be stored in formats other then a bitmap format. For example, the images may be stored using vector graphics. In one embodiment, the spatial hierarchy may not be related to the hierarchical arrangement of physical spaces in the environment. For example, the spatial hierarchy may group all bedrooms together even though the bedrooms may not be adjacent spaces. The art distribution system may also allow for multiple hierarchies to be defined to represent the spaces in the environment. A user can select the hierarchy of interest when assigning play lists. An art distribution system may be implemented using the techniques and facilities described in U.S. Patent Applications entitled "Method and System for Tracking Software Components." Accordingly, the invention is not limited to the specific embodiments, but instead the scope invention is specified by the following claims.

What is claimed is:

1. A method in a system for displaying art images in a distributed physical environment having a plurality of rooms, each room having a display device capable of displaying art images, comprising:

providing a representation of a plurality of hierarchical groups of rooms, each room in the environment being associated with at least one of the plurality of groups;

determining a first hierarchical group of rooms from the representation;

determining a first play list of art images to be displayed in the rooms associated with the first group; and causing the first play list of art images to be displayed on the display devices of the rooms associated with the first group, such that each room displays art images from the first play list while the other rooms of the first group also display art images from the first play list.

2. The method of claim 1 wherein the plurality of groups further comprise a second hierarchical group, and wherein the first play list of art images to be displayed in the first group is also automatically determined to be displayed in the second group, such that the same art images are caused to be displayed in the rooms of the first group and the rooms of the second group.

3. The method of claim 1, further comprising:

determining a second hierarchical group of rooms from the representation;

determining a second play list of art images to be displayed in the second group of rooms; and causing the second play list of art images to be displayed on the display devices of the rooms associated with the second group such that each room that is associated with the first group that is not also a room associated with the second group displays the first play list while each room associated with the second group displays the second play list.

4. The method of claim 3 wherein all of the rooms in the second group are also rooms in the first group.

5. The method of claim 1, further comprising:

determining a second hierarchical group of rooms from the representation;

determining a second play list of art images to be displayed in the determined second group of rooms; and causing the second play list of art images to be displayed on the display devices of the rooms associated with the second group such that each room associated with the first group displays the first play list while each room associated with the second group that is not also a room associated with the first group displays the second play list.

6. The method of claim 5 wherein all of the rooms in the second group are also rooms in the first group.

7. The method of claim 1, further comprising:

determining a selected room in the first group;

determining a second play list of art images to be displayed in the selected room;

causing the second play list of art images to be displayed on the display device of the selected room such that the device of the selected room displays the second play list of art images while the other rooms in the first group display the first play list of art images.

8. The method of claim 1 wherein each room has a user control point device for receiving input.

9. The method of claim 8 wherein the user control point device is a touch panel display.

10. The method of claim 8, wherein the first play list of art images is determined using the user control point device.

11. The method of claim 8 wherein the first group of rooms is determined using the user control point device.

12. The method of claim 8 wherein the rooms are associated into the plurality of groups using the user control point device.

13. A system for displaying art images in a distributed physical environment having a plurality of rooms, each room having a display device capable of displaying art images, comprising:

user control point device that
  associates each room with at least one of the plurality of hierarchical groups;
  determines a selected hierarchical group of rooms; and
  determines a first play list of art images to be displayed in the rooms associated with the selected group; and art image distribution system that receives input from the user control point device and causes the first play list of art images to be displayed on the display devices of the rooms associated with the selected group, such that each room displays art images from the first play list while the other rooms of the selected group also display art images from the first play list.

14. The system of claim 13 wherein the selected group of rooms comprises a first hierarchical group of rooms, wherein the user control point device determines a second selected hierarchical group of rooms and wherein the art image distribution system causes the same art images to be displayed on the display devices of the rooms associated with the second selected group of rooms as on the display devices of the rooms associated with the first group of rooms.

15. The system of claim 13 wherein the selected group of rooms comprises a first hierarchical group of rooms, wherein the user control point device determines a second selected hierarchical group of rooms and a second play list of images, and wherein the art image distribution system causes the second play list of images to be displayed on the display devices of the rooms associated with the second group and causes the first play list of images to be displayed on the display devices of the rooms of the first group that are not also rooms of the second group.

16. The system of claim 13 wherein the selected group of rooms comprises a first hierarchical group of rooms, wherein the user control point device determines a second selected hierarchical group of rooms and a second play list of images, and wherein the art image distribution system causes the first play list of images to be displayed on the display devices of the rooms associated with the first group and causes the second play list of images to be displayed on the display devices of the rooms of the second group that are not also rooms of the first group.

17. A method in a system for displaying images in a physical environment, the environment having a plurality of spaces, each space having an associated display device capable of displaying an image, comprising:

associating the plurality of spaces with a first hierarchical group;

determining a first image to be displayed in the spaces of the first group; and causing the first image to be displayed on the display devices associated with the spaces of the first group, such that each space of the first group displays the first image while the other spaces of the first group also display the first image.

18. The method of claim 17, the environment having a second plurality of spaces, each of the second plurality of spaces having an associated display device capable of displaying an image, further comprising:

associating the second plurality of spaces with a second hierarchical group; and causing the first image to be displayed on the display devices associated with the spaces of the second group, such that the same image is caused to be displayed in the spaces of the second group and in the spaces of the first group.

19. The method of claim 17, the environment having a second plurality of spaces, each of the second plurality of spaces having an associated display device capable of displaying an image, further comprising:

associating the second plurality of spaces with a second hierarchical group;

determining a second image to be displayed in the second group;

causing the second image to be displayed on the display devices associated with the spaces of the second group such that each space of the first group that is not also a space of the second group displays the first image while each space of the second group displays the second image.

20. The method of claim 19 wherein all of the spaces of the second group are also spaces of the first group.

21. The method of claim 17, the environment having a second plurality of spaces, each of the second plurality of spaces having an associated display device capable of displaying an image, further comprising:

associating the second plurality of spaces with a second hierarchical group;

determining a second image to be displayed in the second group;

causing the second image to be displayed on the display devices associated with the spaces of the second group such that each space of the first group displays the first image while each space of the second group that is not also a space of the first group displays the second image.

22. The method of claim 21 wherein all of the spaces of the second group are also spaces of the first group.

23. The method of claim 17, further comprising:

determining a selected space of the first group;

determining a second image to be displayed in the selected space; and causing the second image to be displayed on the display device associated with the selected space such that the selected space displays the second image while the other spaces of the first group display the first image.

24. The method of claim 17, wherein the determined first image is an art image.

25. The method of claim 17, wherein the determined first image comprises a play list of multiple images.

26. The method of claim 25, wherein the multiple images are art images.

27. The method of claim 17 wherein each space has a user control point device for receiving input.

28. The method of claim 27 wherein the user control point device is a touch panel display.

29. The method of claim 27 wherein the first image is determined using the user control point device.

30. The method of claim 27 wherein the first group is determined using the user control point device.

31. The method of claim 27 wherein the spaces are associated with the first group using the user control point device.

32. A computer-readable memory medium containing instructions for controlling a computer processor to display images in a physical environment, the environment having a plurality of spaces, each space having an associated display device capable of displaying an image, by:

associating the plurality of spaces with a first hierarchical group;

determining a first image to be displayed in the spaces of the first group; and causing the first image to be displayed on the display devices associated with the spaces of the first group, such that each space of the first group displays the first image while the other spaces of the first group also display the first image.

33. The computer-readable memory medium of claim 32, the environment having a second plurality of spaces, each of the second plurality of spaces having an associated display device capable of displaying an image, containing further instructions that control the computer processor by:

associating the second plurality of spaces with a second hierarchical group; and causing the first image to be displayed on the display devices associated with the spaces of the second group, such that the same image is caused to be displayed in the spaces of the second group and in the spaces of the first group.

34. The computer-readable memory medium of claim 32, the environment having a second plurality of spaces, each of the second plurality of spaces having an associated display device capable of displaying an image, containing further instructions that control the computer processor by:

associating the second plurality of spaces with a second hierarchical group;

determining a second image to be displayed in the second group;

causing the second image to be displayed on the display devices associated with the spaces of the second group such that each space of the first group that is not also a space of the second group displays the first image while each space of the second group displays the second image.

35. The computer-readable memory medium of claim 34 wherein all of the spaces of the second group are also spaces of the first group.

36. The computer-readable memory medium of claim 32, the environment having a second plurality of spaces, each of the second plurality of spaces having an associated display device capable of displaying an image, containing further instructions that control the computer processor by:

associating the plurality of spaces with a second hierarchical group;

determining a second image to be displayed in the second group;

causing the second image to be displayed on the display devices associated with the spaces of the second group such that each space of the first group displays the first image while each space of the second group that is not also a space of the first group displays the second image.

37. The computer-readable memory medium of claim 36 wherein all of the spaces of the second group are also spaces of the first group.

38. The computer-readable memory medium of claim 32, containing further instructions that control the computer processor by:

determining a selected space of the first group;

determining a second image to be displayed in the selected space; and causing the second image to be displayed on the display device associated with the selected space such that the selected space displays the second image while the other spaces of the first group display the first image.

39. The computer-readable memory medium of claim 32, wherein the determined first image is an art image.

40. The computer-readable memory medium of claim 32, wherein the determined first image comprises a play list of multiple images.

41. The computer-readable memory medium of claim 32 wherein each space has a user control point device for receiving input.

42. A system for displaying images in a physical environment, the environment having a plurality of spaces, each space having an associated display device capable of displaying an image, comprising:

plurality of art space controllers, each associated with a space of the plurality of spaces and the associated display device of the space, that each
- receive an indication of an image; and
- cause the associated display device of the associated space to display the indicated image in the space; and art administration system that
- associates a plurality of the spaces with a first hierarchical group;
- determines a first image to be displayed in the spaces that belong to the first group; and
- sends an indication of the first image to the art space controller associated with each space that belongs to the first group.

43. The system of claim 42 wherein the same image is displayed in each of the spaces that belong to the first group.

44. The system of claim 42 wherein the art administration system further
- associates a second plurality of spaces with a second hierarchical group,
- determines a second image to be displayed in the spaces that belong to the second group, and
- sends an indication of the second image to the art space controller associated with each space that belongs to the first group that also belongs to the second group.

45. The system of claim 42 wherein the art administration system further associates a second plurality of spaces with a second hierarchical group,
- determines a second image to be displayed in the spaces that belong to the second group, and
- sends an indication of the second image to the art space controller associated with each space that belongs to the second group that does not also belongs to the first group.

46. The system of claim 42, further comprising:
user control point device that receives selections from an operator and transmits the selections to the art administration system to arrange the plurality of spaces into hierarchical groups and to select images for display.

47. The system of claim 42, further comprising: image server that
- receives a request for an indicated image for an indicated space,
- retrieves the indicated image, and
- forwards the retrieved image to the art space controller associated with the indicated space.

48. The system of claim 47 wherein the indicated image is retrieved from an image storage system that is not located at the image server.

49. The system of claim 42 wherein the first image is an art image.

* * * * *

UNITED STATES PATENT AND TRADEMARK OFFICE
CERTIFICATE OF CORRECTION

PATENT NO.    : 6,670,934 B1
DATED         : December 30, 2003
INVENTOR(S)   : David Muoio, James Cook and Richard Hasha It is certified that error appears in the above-identified patent and that said Letters Patent is hereby corrected as shown below:

Column 4,
Line 1, delete "display" and insert -- displayed -- therefor;
Line 7, delete "devices" and insert -- device -- therefor;

Column 6,
Line 43, delete "to";

Column 8,
Line 19, delete the second occurrence of "a";
Line 43, delete "assign" and insert -- assigned -- therefor;
Line 48, delete "to";

Column 10,
Line 16, delete "describe" and insert -- described -- therefor;
Line 22, delete "the" and insert -- that -- therefor;

Column 16,
Line 8, delete "belongs" and insert -- belong -- therefor.

Signed and Sealed this

Thirtieth Day of March, 2004

JON W. DUDAS
*Acting Director of the United States Patent and Trademark Office*